H. E. DEY.
APPARATUS FOR CONTROLLING ELECTRIC MOTORS.
APPLICATION FILED AUG. 6, 1908.
942,196. Patented Dec. 7, 1909.
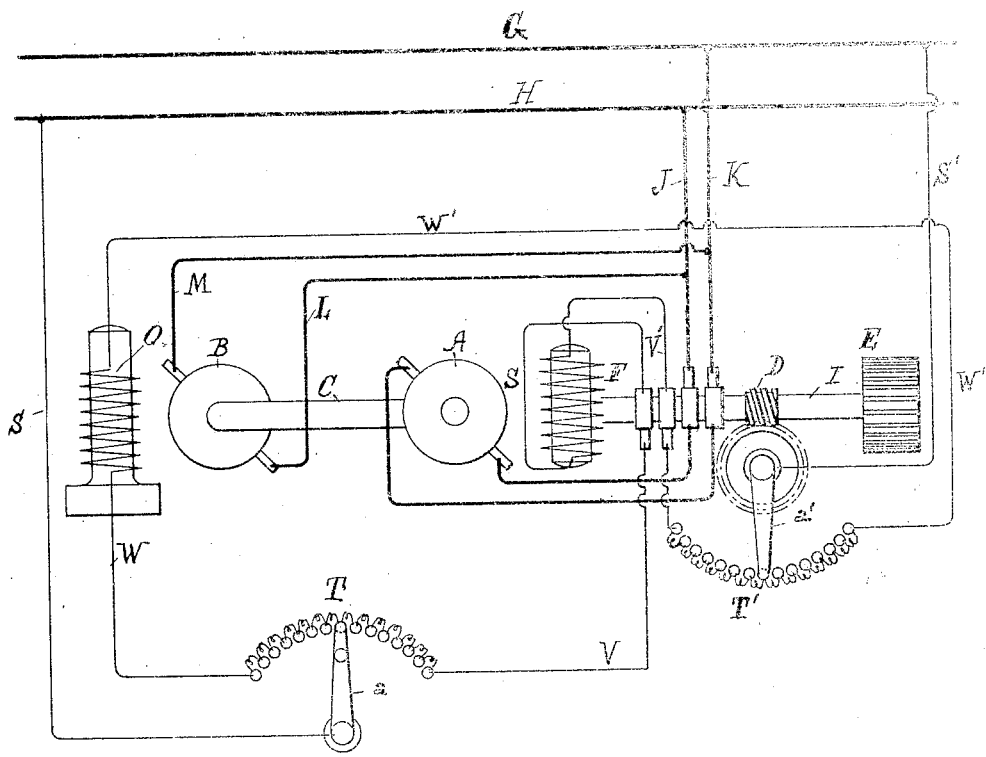

UNITED STATES PATENT OFFICE.

HARRY E. DEY, OF JERSEY CITY, NEW JERSEY, ASSIGNOR TO BEN T. CABLE, OF NEW YORK, N. Y.

APPARATUS FOR CONTROLLING ELECTRIC MOTORS.

942,196.  Specification of Letters Patent.  Patented Dec. 7, 1909.

Application filed August 6, 1908. Serial No. 447,195.

*To all whom it may concern:*

Be it known that I, HARRY E. DEY, a citizen of the United States, and a resident of Jersey City, in the county of Hudson and State of New Jersey, have invented certain new and useful Improvements in Apparatus for Controlling Electric Motors, of which the following is a specification.

My invention relates to that class of apparatus in which the speed of the load is controlled by a differential electrical effect on two motors. In such apparatus, a type of which may be found in my Patent No. 805,188, issued November 21st, 1905, to which reference may be had for such details as are not necessary to be shown in the present application, a moving element of each motor is mounted upon a shaft common to both and therefore they turn in unison. This fact remains true whether power is received through one motor or the other, or through both, and while I speak of them by the generic term of motor, it will be readily understood that either of the so-called motors may act as a dynamo, or generator, as the occasion arises. Each of these motors is essentially composed of the usual elements known as an armature and a field. While mechanically the different parts may be transposed I will now assume that one field magnet is arranged to remain stationary, the two armatures are mechanically joined together and the other field magnet is rotatively mounted to drive the load.

The current which supplies the motors and which energizes the field magnets is drawn, as usual, from main line wires and that portion of it which energizes the field magnet passes through resistances, or rheostats, by means of which the field strengths of the two motors are varied relative to each other. As is well known the control of speed obtained by this arrangement is as follows: The speed of the two elements which are joined together is fixed by the speed of the stationary field motor, and the speed of the latter in turn by its field strength. Now the speed of the elements of second motor relative to each other, is also fixed by the field strength of the second motor, and as its armature speed has been fixed by the speed of the other armature with which it is joined, the field of the second motor will move at a velocity which will represent the difference in speed of the two motors. The direction of that motion will depend on whether the difference of speed is positive or negative. Ordinarily one motor acts as a motor and the other, taking the reaction acts as a dynamo.

When the two field magnets are approximately of equal strength the load will remain stationary but as the rheostat arm moves thus decreasing the field strength of one field magnet by inserting more resistance and increasing that of the other field magnet by cutting out part of the resistance one of the motors increases its speed owing to well known electrical reasons while the other decreases in speed and, as before explained the load has to make up the relative difference in speed.

When controlling a load at a distance where it is not practicable to observe the amount of motion of load, for example, the rudder of a ship controlled from the bridge, it has been found desirable to move the indicator located at the controlling station to the desired position of the rudder, and have the rudder move to that position and automatically stop. To accomplish this in the simplest way I provide in addition to the controlling rheostat a second rheostat mechanically operated by the load and connected in series with the magnets and the controlling rheostat as shown in the accompanying diagram. As the second rheostat is moved by the load it adds resistance to the low resistance side and cuts out resistance from the high resistance circuits and thus when it arrives at the predetermined position the two circuits become balanced and the load comes to a standstill.

My invention consists therefore in an apparatus for controlling electric motors, which is composed of a dynamo-electric machine with one stationary and one rotary element, a second dynamo-electric machine both elements of which are rotary and one of which is mechanically connected to the rotary element of the first dynamo-electric machine, a primary resistance whereby the relative strength of the field magnets of said machines is varied and controlled, and a counter resistance operated by the load.

In the accompanying drawing I have shown my apparatus only diagrammatically, as the details of construction of electric motors and their auxiliary devices are too well known to require description; the important thing in practicing my invention being to know the wiring and the relative location of the parts.

A is the armature, of one of the motors which may be taken as the load motor.

E represents the load which in this case is a gear for turning the rudder-shaft of a vessel.

B is the armature of the stationary field motor. Both the armatures are mounted on the shaft C.

F is the field magnet for armature A. It is carried on the load shaft I.

O is the stationary field magnet for the armature B which controls the shaft C.

T is the primary resistance or rheostat.

T' is the secondary or counter resistance or rheostat the arm of which is turned by the worm D on the load shaft I to correspond with the turning of the arm of the primary rheostat.

The main line wires G, H, supply current to the armature A by the wires J, K, which lead to the armature through collector rings and to the field magnet F by wires S, V, V', S' through the resistances T and T'. They also supply the armature B through the wires L, M, and its stationary field magnet O by the wires S, W, W' and S' through the resistances T and T'.

The position of the handle a of the rheostat or resistance T determines the speed and direction of the rotation imparted to the work shaft I from the motor shaft C.

The operation of the device is as follows: With the arm a of the transmitting rheostat T at the central position as shown in the drawing there will be an equal amount of resistance in each field. Consequently both fields will be of equal magnetic strength and the tendency of both motors will be to rotate at the same speed. As the speed of armature B is fixed by its stationary field and this armature is mechanically connected with armature A, armature A will have to rotate at the same speed as armature B and thus there will be no revolution of the load E, which might otherwise be caused by the reaction between A and its field magnet F.

If the arm a of rheostat T is turned to the left it cuts out resistance from the field magnet O and at the same time adds resistance to field magnet F. This reduces the speed of armature B, and A, being mechanically connected to it, is also brought down to the same speed. The relative speed between A and F however has been increased. Consequently the load E will take a motion opposite to that of armature A equal in speed to the difference between that of the two armatures and the relative speed of A and F. If however the arm a of the rheostat T is turned to the right, the magnetic strength of the magnet F is increased while that of magnet O is decreased, thus speeding up the two armatures A and B due to the relation of B to its stationary magnet O. At the same time the relative speed between A and F will be greatly reduced. The load then will rotate in the same direction as A but at a speed equal to the difference between the ratio of A and F and the speed of B;—O being stationary.

Whenever the load rotates it moves the arm a' of rheostat T' in a direction so related to the movement of the arm a as to tend to bring the two resistances back to an equality by cutting in an amount of resistance equal to that cut out or cutting out an amount equal to that cut in. Whether the arms follow each other depends upon whether one is relatively upside down or not as shown. As soon as the two resistances have been made equal again, the load becomes stationary. The work shaft therefore is always ready to hold fast in any given position which may be assumed by the primary rheostat.

The many uses and advantages of this invention will, I think, be readily understood without further explanation.

I claim:

An apparatus for controlling electric motors which consists of a dynamo electric machine with one stationary and one rotary element, a second dynamo electric machine, both elements of which are rotary and one of which is mechanically connected to the rotary element of the first dynamo electric machine, a primary resistance, whereby the relative strength of the field magnets of said machines is varied and controlled, and a counter resistance operated with the load.

HARRY E. DEY.

Witnesses:
HELEN G. MURPHY,
W. T. PREBLE, Jr.